(12) United States Patent
Melton

(10) Patent No.: US 12,062,092 B2
(45) Date of Patent: Aug. 13, 2024

(54) USER-DEFINED MATCHING

(71) Applicant: REFINITIV US ORGANIZATION LLC, New York, NY (US)

(72) Inventor: Hayden Melton, Philadelphia, PA (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 159 days.

(21) Appl. No.: 17/526,008

(22) Filed: Nov. 15, 2021

(65) Prior Publication Data
US 2022/0156811 A1 May 19, 2022

Related U.S. Application Data

(60) Provisional application No. 63/113,924, filed on Nov. 15, 2020.

(51) Int. Cl.
*G06Q 40/04* (2012.01)

(52) U.S. Cl.
CPC .................... *G06Q 40/04* (2013.01)

(58) Field of Classification Search
CPC .............................. G06Q 40/00; G06Q 40/04
USPC ............................................................ 705/35
See application file for complete search history.

(56) References Cited

U.S. PATENT DOCUMENTS

| | | | | |
|---|---|---|---|---|
| 5,297,032 A * | 3/1994 | Trojan | ................... | G06Q 40/04 705/37 |
| 5,761,442 A * | 6/1998 | Barr | ....................... | G06Q 40/06 705/36 R |
| 5,812,988 A * | 9/1998 | Sandretto | ............... | G06Q 40/00 702/179 |
| 5,845,266 A * | 12/1998 | Lupien | ................... | G06Q 40/00 705/36 R |
| 6,014,645 A * | 1/2000 | Cunningham | ......... | G06Q 40/00 235/379 |
| 6,058,379 A * | 5/2000 | Odom | .................... | G06Q 40/00 705/37 |
| 6,098,051 A * | 8/2000 | Lupien | ................... | G06Q 40/08 705/30 |
| 6,313,833 B1 * | 11/2001 | Knight | ................... | G06Q 40/06 705/37 |
| 6,345,090 B1 * | 2/2002 | Walker | ................. | G06Q 20/403 379/114.03 |

(Continued)

OTHER PUBLICATIONS

International Search Report and Written Opinion dated Feb. 22, 2022, issued in the corresponding PCT Application No. PCT/IB2021/060543, pp. 1-16.

(Continued)

*Primary Examiner* — Kirsten S Apple
(74) *Attorney, Agent, or Firm* — Pillsbury Winthrop Shaw Pittman LLP

(57) ABSTRACT

User-defined matching of objects is disclosed in which an electronic exchange obtains and executes user-defined rules code that overrides default exchange program code for matching objects at the electronic exchange. The electronic exchange may provide an Application Programming Interface ("API") that exposes various immutable fields that are used to match objects. The API may also include default program code that may be overridden by the user-defined rules code, which may be implemented as a class extension or interface executed by the electronic exchange.

20 Claims, 4 Drawing Sheets

(56) References Cited

U.S. PATENT DOCUMENTS

| | | | | |
|---|---|---|---|---|
| 6,954,758 B1* | 10/2005 | O'Flaherty | | G06Q 30/02 707/999.102 |
| 7,165,037 B2* | 1/2007 | Lazarus | | G06Q 30/0269 705/7.31 |
| 7,376,431 B2* | 5/2008 | Niedermeyer | | G07C 9/22 379/189 |
| 8,104,678 B2* | 1/2012 | Yoshikawa | | G06Q 20/4037 235/492 |
| RE43,435 E* | 5/2012 | Krause | | G06Q 40/06 705/37 |
| 8,234,201 B1* | 7/2012 | Canabarro | | G06Q 40/06 705/36 R |
| 8,412,605 B2* | 4/2013 | Griffin | | G06Q 40/02 705/76 |
| 8,930,257 B1* | 1/2015 | Howorka | | G06Q 40/04 705/37 |
| 2002/0161677 A1* | 10/2002 | Zumbach | | G06Q 40/00 707/E17.001 |
| 2002/0184134 A1* | 12/2002 | Olsen | | G06Q 40/06 705/37 |
| 2003/0149648 A1* | 8/2003 | Olsen | | G06Q 40/00 705/35 |
| 2004/0162772 A1* | 8/2004 | Lewis | | G06Q 40/03 705/34 |
| 2005/0187854 A1* | 8/2005 | Cutler | | G06Q 40/04 705/37 |
| 2005/0192899 A1* | 9/2005 | Reardon | | G06Q 40/00 705/40 |
| 2007/0244795 A1* | 10/2007 | Lutnick | | G06Q 40/00 705/37 |
| 2008/0301019 A1* | 12/2008 | Monk | | G06Q 20/4016 705/35 |
| 2010/0023460 A1* | 1/2010 | Hughes | | G06Q 40/06 705/36 R |
| 2010/0312701 A1* | 12/2010 | Bosch | | G07F 19/20 705/43 |
| 2011/0145149 A1* | 6/2011 | Valdes | | G06Q 20/28 705/44 |
| 2011/0178912 A1* | 7/2011 | Parsons | | G06Q 40/00 705/35 |
| 2011/0264581 A1* | 10/2011 | Clyne | | G06Q 20/10 705/39 |
| 2012/0029956 A1* | 2/2012 | Ghosh | | G06Q 10/063 705/7.11 |
| 2012/0278254 A1* | 11/2012 | Rosenthal | | G06Q 40/06 705/36 R |
| 2012/0323764 A1* | 12/2012 | Boberski | | G06Q 40/04 705/39 |
| 2013/0226764 A1* | 8/2013 | Battyani | | G06Q 40/04 705/37 |
| 2014/0156491 A1* | 6/2014 | Koh | | G06Q 40/04 705/37 |
| 2014/0229353 A1* | 8/2014 | Lutnick | | G06Q 40/04 705/37 |
| 2015/0235318 A1* | 8/2015 | Huan | | G06Q 40/04 705/37 |
| 2016/0267593 A1 | 9/2016 | Melton | | |
| 2023/0020590 A1* | 1/2023 | Pendharkar | | G06Q 30/0206 |

OTHER PUBLICATIONS

Anonymous, "Program the Blockchain, Writing a Vickrey Auction Contract," Nov. 9, 2020, pp. 1-9, KP055890895.

Bina, Ramamurthy, "Blockchain in Action Part 2, Chapter 5 Security and Privacy," Sep. 1, 2020, pp. 1-5, Manning Publications Co., XP055890896.

International Preliminary Report on Patentability and Written Opinion issued in International Patent Application No. PCT/IB2021/060543, dated May 16, 2023.

* cited by examiner

300

PROVIDE ACCESS TO AN APPLICATION PROGRAMMING INTERFACE (API) THAT EXPOSES ONE OR MORE FIELDS USED TO MATCH OBJECTS AND IMPLEMENTS DEFAULT EXCHANGE RULES DEFINED BY THE ELECTRONIC EXCHANGE FOR MATCHING OBJECTS AT THE ELECTRONIC EXCHANGE
302

RECEIVE, FROM A PARTICIPANT, USER-DEFINED RULES CODE AND AN OBJECT TO BE MATCHED WITH OTHER OBJECTS AT THE MATCHING ENGINE, THE OBJECT SPECIFYING A VALUE FOR EACH OF THE ONE OR MORE FIELDS
304

EXECUTE THE USER-DEFINED RULES CODE TO OVERRIDE, VIA CLASS EXTENSION OR IMPLEMENTATION OF AN INTERFACE, THE DEFAULT EXCHANGE RULES WITH ONE OR MORE USER-DEFINED RULES ENCODED IN THE USER-DEFINED RULES CODE
306

GENERATE AN ORDERED LISTING OF THE OTHER OBJECTS AT THE ELECTRONIC EXCHANGE AGAINST WHICH THE OBJECT IS TO BE MATCHED BASED ON THE USER-DEFINED RULES INSTEAD OF THE DEFAULT EXCHANGE RULES AND THE VALUE FOR EACH OF THE ONE OR MORE FIELDS
308

*FIG. 3*

USER-DEFINED MATCHING

RELATED APPLICATIONS

This application claims priority to U.S. Provisional Patent Application No. 63/113,924, filed on Nov. 15, 2021, the content of which is incorporated by reference in its entirety herein.

BACKGROUND

In financial markets implementing 'last-look' a dealer—for a short period after they are matched with a price-taker, and after they have received notification of that match from the exchange—may have discretion as to whether they will accept or reject that trade. In large part it is due to the existence of last-look there is increasing recognition that best-execution from the perspective of a price-taker requires consideration of factors beyond the traditional price-time matching algorithm that is widely implemented on existing electronic financial exchanges. Such factors include, though are not necessarily limited to, the probability a price-taker's object will be rejected by a given dealer (inferred from historical rejection rates on that instrument between that dealer and taker, and under similar market conditions), the cost-of-reject in terms of adverse market movement between submission of the original taker object and resubmission after reject, and so on.

Given the above it follows that there may exist a desire among price-takers to be matched with dealers in a manner other than 'price-time'. Further, what one price-taker considers relevant factors for achieving best-execution of their objects may be vastly different from those a different price-taker considers relevant. Further still, and for many good reasons, electronic financial exchanges tend to deliberately limit pre-trade transparency so some or all of the factors a price-taker would like to consider prior to sending a taker object to an exchange are not even observable by that taker. Many of the factors price-takers may consider relevant are however observable by the exchange itself, and especially with respect to the bilateral credit lines that are a prerequisite to a trade even being initially formed, the exchange is the only entity with complete knowledge of these.

It follows then that in the pursuit of best-execution for price-takers there exists a need for electronic financial exchanges to provide user-defined matching algorithms that consider not only traditional factors such as equitable treatment of price-making objects, and allowing matches to occur only to the extent that bilateral credit lines between parties are sufficient, but also that consider other user-defined factors on a per price-taker basis. Systems and methods for this 'user-defined matching' thus are disclosed herein.

SUMMARY

The disclosure relates to systems, methods, and computer-readable media for user-defined matching of objects at an electronic exchange. The electronic exchange may provide an Application Programming Interface ("API") that exposes various immutable fields that are involved in matching objects. The API may also include default exchange code that may be overridden by the user-defined rules code provided by a participant. The user-defined rules code be source code or binary code in a computer programming language, such as Java.™ The user-defined rules code may be implemented as a class extension or interface executed by the electronic exchange. Through execution of the user-defined rules code, the electronic exchange is improved to facilitate user-defined matching of objects, which may maximize fill rates and minimize unfilled objects. The electronic exchange may perform validation checks on results of the user-defined rules code to enhance the security and integrity of the electronic exchange. Thus, fill rate efficiency of the electronic exchange may be achieved in addition to providing enhanced participant control over match logic, while maintaining the security and integrity of the electronic exchange.

BRIEF DESCRIPTION OF THE DRAWINGS

Features of the present disclosure may be illustrated by way of example and not limited in the following Figure(s), in which like numerals indicate like elements, in which:

FIG. 3 illustrates another example of a method for user-defined matching of objects at an electronic exchange.

DETAILED DESCRIPTION

Systems and methods are disclosed to enable the operator of an electronic financial exchange to provide users of (i.e., market participants on) that exchange with the capability to define rules to determine the priority against which they will be matched against resting objects on that exchange. The exchange operator defines parameters they wish to make available to users in specifying their matching rules and collects the values of those parameters in a historical datastore that can be programmatically queried by participants in the execution of their rules. Exchange users specify prioritized rules by way of executable or compilable computer code that is transmitted to and stored by the exchange in its rules datastore. Upon receipt of an object the exchange looks up the stored rule that applies to that object and executes the sending participant's rule's code with parameters from the historical datastore and limit object book. The priority returned by those rules is the priority in which the exchange will attempt to match objects. For a period after a match the exchange populates its historical datastore with the values of parameters specifically pertaining to that match; it otherwise continually updates that historical datastore with parameters that pertain to general market conditions for use in future rule executions.

Figure 1:
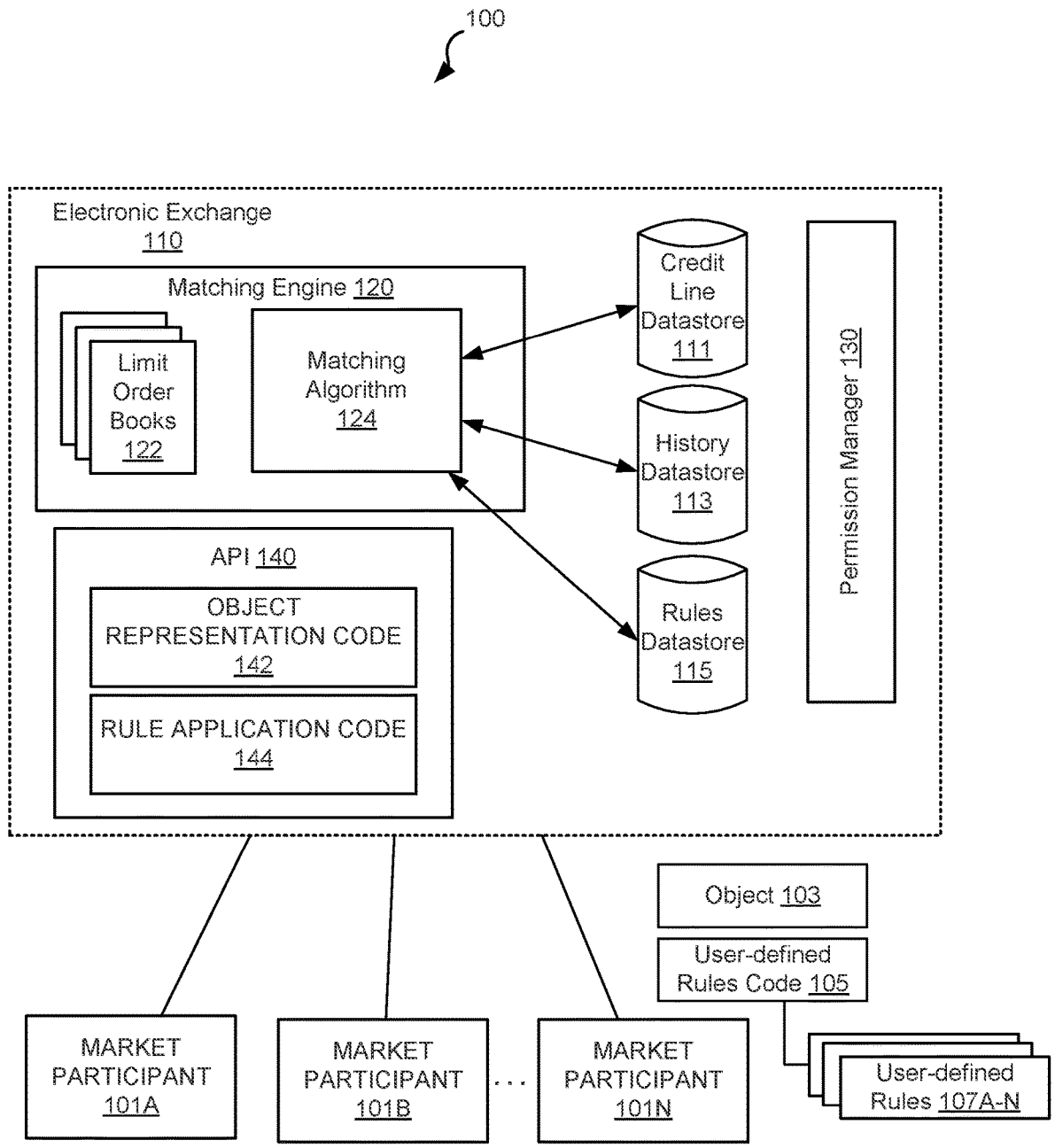
FIG. 1 illustrates an example of a computer system for user-defined matching of objects at an electronic exchange.

FIG. 1 illustrates an example of a computer system 100 for user-defined matching of objects at an electronic exchange 110. The electronic exchange 110 may include a matching engine 120, one or more limit object books 122, a matching algorithm 124, a permission manager 130, an Application Programming Interface ("API") 140, and/or other components. The electronic exchange 110 may include various datastores such as a credit line datastore 111, a historical datastore 113, a rules datastore 115, and/or other datastores.

Each market participant 101 may send objects 103 (only a single object 103 is illustrated in FIG. 1 for clarity) to the electronic exchange 110, receive messages responsive to those objects 103, receive market data updates from the electronic exchange 110, and/or otherwise interact with the electronic exchange 110. The objects 103 may be processed by the matching engine 120, which may host the limit object books 122 for various instruments for which the objects 103 relate. Each object 103 may correspond to an order to be matched at the electronic exchange 110 with other objects (other orders). The term "market participant" (or simply "participant") is intended to be broadly construed to refer to any entity that receives (through a computing device) market data from the venue, or sends (through a computing device) object-related messages to the venue, including, but not limited to: a firm that conducts business on the electronic trading venue, a credit entity associated with such a firm (a single firm may have a plurality of credit entities), or a user (human or otherwise). The infrastructure between the market participants and matching engine component of the electronic exchange 110 (such as object gateways and market data distributors are well-known and therefore omitted from FIG. 1 for clarity).

The matching engine 120 may host the limit object books 122 for various instruments and process the objects 103 received from market participants 101 against the limit object books 122. The matching engine 120 may use default exchange code to match a given object 103 with other objects in the limit object books 122. For example, an object 103 may be a taker object that takes a maker object in the limit object book 122. Other types of objects 103 may be matched against the limit object books 122.

As described herein, the electronic exchange 110 may also be improved to accept and execute user-defined rules code 105 that overrides the default exchange rules code. For example, each market participant 101 may provide user-defined rules code 105 to the electronic exchange 110 (only a single user-defined rules code 105 is illustrated in FIG. 1 for clarity).

The user-defined rules code 105 may include source code or binary code. An electronic exchange 110 may interpret and execute source code if the computer code includes source code that is written in an interpreted software language. The electronic exchange may compile the source code into binary code and execute the binary code if the computer code includes source code that is written in a compiled software language. In some examples, the user-defined rules code 105 may include byte code that is compiled to form binary code. The electronic exchange 110 may be further improved to monitor and provide access to certain historical data and certain rules to market participants 101 to help the participants generate user-defined rules 107.

In some examples, the user-defined rules code 105 provided by a market participant 101 may be stored, at the rules datastore 115, in association with a unique identifier that identifies the market participant. In this way, the matching engine 120 may retrieve and execute the user-defined rules code 105 and the user-defined rules 107 encoded therein provided by the market participant 101.

To facilitate user-defined rules matching, the electronic exchange 110 may provide market participants 101 with access to an API 140. The API 140 may provide an interface through which market participants 101 may provide the electronic exchange 110 with user-defined rules code 105 that encodes one or more user-defined rules 107 (illustrated as user-defined rules 107A-N).

The API 140 may include object representation code 142 that represents an object submitted by market participants 101. An example of the object representation code 142 is provided below for illustration and not limitation. Various examples of the API 140 and/or user-defined rules code 105 illustrated herein will use a Java™-like programming language with Javadoc-like documentation for illustrative convenience. Other computer programming languages may be used as well.

Example Object Representation Code 142

```
/**
 *Representation of an Object sent to the exchange; fields immutable to clients
 of this class.
 */
class Object {
    /** The limit price of the object */
    public final double limitPrice;
    /** Quantity of the object per the exchange's convention
    e.g., 1 could be 1mio of aud on the instrument 'aud/usd' */
    public final long quantity;
    /** Indicates whether the object is a buy (true) or
    sell (false) object */
    public final boolean sideIsBuy;
    /** An identifier that uniquely identifies a participant
    * without revealing that participant's name */
    public final int participantId;
}
```

Referring to the above example, the object representation code 142 may expose (provide access to) one or more fields that are used as parameter inputs to the user-defined rules 107. The exposed fields may be read-only by the market participants 101 that access them. The fields may provide the limit price (the "limitPrice" variable in the above example), quantity ("quantity" variable), side ("sideIsBuy" variable: in the above example, this is a Boolean that indicates whether the object is a buy object—if not, a sell object), unique identifier ("participantId") (also referred to herein as a participant identifier) of the participant 101 that sent the object 103, and/or other data relating to the object 103. It should be noted that the participant identifier may be anonymized in that it does not include the name of the market participant 101 identified by the participant identifier. This may ensure equitable treatment of makers by a taker so that, for example, a maker cannot be singled out based on their name.

The API 140 may include rule application code 144 encoded by default exchange rules code that carries out default exchange rules. The default user-defined rules code may be overridden by the user-defined rules code 105, which encodes user-defined rules 107. Thus, by overriding the default user-defined rules code with user-defined rules code 105, the electronic exchange 110 provides a mechanism to use user-defined rules 107 instead of default exchange rules, thereby improving execution efficiency of the electronic exchange 110 since such user-defined rules 107 may result in higher fill rates (reducing unmatched objects).

The rule application code 144 may take as input various parameters such as the instrument, a time relating to when an object 103 to be matched is received at the electronic exchange 110, an identification of the object 103, a listing of other objects against which the object 103 is to be received, connections to the historical datastore 113 and rules datastore 115, and/or other inputs. Based on the various input parameters, the method and returns an ordered listing of the other objects against which object 103 is to be matched. The object listing of the other objects in the return type is the ordering in which the electronic exchange will attempt to match them. The exchange operator may perform additional checks on this returned object to ensure it contains exactly the same objects as the input parameter makerObjects; if it does not the exchange may have computer code that takes action to reject the list and instead use the ordering input as makerObjects. Also provided as input to the apply Rules( . . . )method is the taker object to which the rules are being applied takerObject, and the time at which the taker object was received unixEpochTime, and references to the Historical datastore and Credit Line Datastore (both as in FIG. 1) by way of the java.sql.Connection datatypes historyDatastore and creditLineDatastore, respectively.

Example Rule Application Code 144

```
/**
* Clients of this class will override the provided default implementation to define their
* own matching rules
* @param instrument the financial instrument to which the taker object and maker objects
* pertain
@param unixEpochTime the time the taker object was received in number of
milliseconds that have elapsed since the Unix epoch
@param takerObject the taker object that will be subject to matching
* @param makerObjects the list of maker objects in the priority object (highest-to-lowest)
they would be considered for matching by the exchange's default matching algorithm
@param historyDatastore the Structured Query Language ("SQL") query-able data
store of fill rates, market impact etc perm issioned for the price taker sending takerObject
* @param creditLineDatastore the SQL query-able data store of credit lines perm issioned
for the price taker sending takerObject
@return the list of maker objects in the priority object (highest-to-lowest) in which they
should be matched
*/
List<Object>applyRules(String instrument, long unixEpochTime,
    Object takerObject, List<Object>makerObjects,
    Connection historyDatastore, Connection creditLineDatastore) throws
Throwable {
    return makerObjects;
}
```

Referring to the above example, the rule application code 144 may include default user-defined rules code for a method "applyRules( )" that takes in input parameters and returns an ordered listing of objects (such as maker objects) against which an object 103 (such as a taker object) is to be matched. The ordered listing that is returned represents the ordering in which the electronic exchange 110 (the matching engine 120) will attempt to match the objects in the listing with the object 103. The electronic exchange 110 may perform additional checks on this returned listing of objects (which may be an object in an object-oriented programming language) to ensure it contains the same objects as the input parameter makerObjects as a check to ensure consistency and prevent tampering. If it does not contain the same objects as the input parameter makerObjects, the electronic exchange 110, such as the matching engine 120, may reject the returned ordered listing and instead use the ordering input as makerObjects. Also provided as input to the applyRules( ) method is the object 103 to which the rules are being applied takerObject, and the time at which the taker object was received unixEpochTime, and references to the historical datastore 113 and credit line datastore 111 by way of the java.sql.Connection datatypes historyDatastore and creditLineDatastore, respectively.

To write rules code against the API 140, a market participant 101 may extend a class or implement an interface defined by the exchange operator to override the default program code of the rule application code 144 (the applyRules( ) method in the above example of the rule application code 144 of the API 140). An example of the user-defined rules code 105 to override the default program code of the rule application code 144 appears below.

Example User-Defined Rules Code 105 that Overrides Rule Application Code 144

```
@Override
List<Object> applyRules(String instrument, long unixEpochTime,
    Object takerObject, List<Object>makerObjects,
    Connection historyDatastore, Connection creditLineDatastore) throws
Throwable {
```

Example a First Rule in the User-Defined Rules Code 105

```
//RULE 1:
//to prevent 'starvation' of dealers i.e., to allow continued collection
// of fill rate data from all dealers (even those not preferred by other
rules),
// this rule specifies that 20% of the time we will chose to use the
exchange's
// default matching algorithm by returning the makerObjects in the same
// priority as we received them
if (Math.random() <0.2) {
    return makerObjects;
}
```

Example a Second Rule in the User-Defined Rules Code 105

```
//RULE 2:
//applies to the instrument 'aud/usd' only; prioritizes maker objects by
// historical fill rates of each dealer
else if (instrument.equals("aud/usd")) {
    //connect to historical datastore and query it using SQL
    Statement stmt =historyDatastore.createStatement();
    ResultSet rs = stmt.executeQuery("SELECT dealer_id FROM ...
WHERE"
        +"instrument="aud/usd" ORDER BY fill_rate DESC");
    //map dealer_id to priority as per SQL resultset
    Map<Integer,Integer> dealerIdToPriority = new
LinkedHashMap<>();
    int priority =0;
    while (rs.next()) {
        int dealerId =rs.getInt(1);
        dealerIdToPriority.put(dealerId, priority++);
    }
    //make copy of maker objects input list, then perform stable sort so
dealers
    // with higher historical fill rates get higher priority for matching
against
    // this taker object
    final List<Object> prioritizedMakerOrds = new
```

-continued

```
ArrayList<>(makerObjects);
   prioritizedMakerOrds.sort(new Comparator<Object>() {
      @Override
      public int compare(Object left, Object right) {
         Integer leftPriority =
            dealerIdToPriority.get(left.participantId) =
null?
            Integer.MAX_VALUE :
            dealerIdToPriority.get(left.participantId);
         Integer rightPriority =
            dealerIdToPriority.get(right.participantId) =
null?
            Integer.MAX_VALUE :
            dealerIdToPriority.get(right.participantId);
         return leftPriority.compareTo(rightPriority);
      }
   });
   //return the maker object list re-prioritized by this rule
   return prioritizedMakerOrds;
}
```

Example a Third Rule in the User-Defined Rules Code 105

```
//RULE 3:
   //On certain instruments credit may be more of an issue than fill rates
so
   // prioritize maker objects by amount of credit remaining with each
dealer
   // so later in the trading day we potentially have more rather than fewer
   // dealers to trade with (i.e., try to exhaust credit later in the trading
   // day rather than earlier)
   else if (instrument.equals("usd/try tom")) {
      //connect to credit line datastore and query it using SQL
      Statement stmt = creditLineDatastore.createStatement();
      ResultSet rs = stmt.executeQuery("SELECT dealer_id FROM ...
WHERE"
         +"instrument="usd/try tom" ORDER BY remaining_credit DESC");
      //map dealer_id to priority as per SQL resultset
      Map<Integer,Integer> dealerIdToPriority = new
LinkedHashMap<>();
      int priority =0;
      while (rs.next()) {
int dealerId =rs.getInt(1);
dealerIdToPriority.put(dealerId, priority++);
      }
      //make copy of maker objects input list, then perform stable sort so
dealers
      // with higher remaining credit rates get priority for matching against
      // this taker object
      final List<Object> prioritizedMakerOrds = new
ArrayList<>(makerObjects);
      prioritizedMakerOrds.sort(new Comparator<Object>() {
         @Override
         public int compare(Object left, Object right) {
            Integer leftPriority =
               dealerIdToPriority.get(left.participantId) =
null?
               Integer.MAX_VALUE :
               dealerIdToPriority.get(left.participantId);
Integer rightPriority =
               dealerIdToPriority.get(right.participantId) =
null?
               Integer.MAX_VALUE :
               dealerIdToPriority.get(right.participantId);
            return leftPriority.compareTo(rightPriority);
         }
      });
      //return the maker object list re-prioritized by this rule
      return prioritizedMakerOrds;
   }
```

Example a Fourth (Implicit) Rule in the User-Defined Rules Code 105

```
//use the exchange's default priority if none of the rules above applies
   return makerObjects;
}
```

Referring to the example of the user-defined rules code 105 above, three express and one implied user-defined rule 107 defined by a market participant 101 are codified against the API 140 using user-defined rules code 105. The above example also uses a Java™-like programming language using this override technique as indicated by a Java™-like @Override annotation. The user-defined rules code 105 may be uploaded by market participants 101 to the electronic exchange 110 in a manner similar to that disclosed in in U.S. patent application Ser. No. 15/064,163, entitled "SYSTEMS AND METHODS FOR OBTAINING AND EXECUTING COMPUTER CODE SPECIFIED BY CODE OBJECTS IN AN ELECTRONIC TRADING VENUE", which is incorporated by reference in its entirety herein.

The first rule (107) incorporates a pseudorandom number generator so that 20% of the time the exchange's default matching algorithm is used. This may be to prevent 'starvation' of new makers who according to the other rules otherwise wouldn't get prioritized highly for matching. It may be desirable to do this because over time a maker's behavior can change, and a taker may need to match with these makers to collect recent data in the historical datastore 113 to observe these changes. This first rule simply returns the ordering of maker objects provided to the method as its input.

The second rule (107) applies only to the instrument 'aud/usd'. The purpose of this rule is to prioritize dealers based on their historical fill rates with the taker (such as a market participant 101 that submitted an object 103 to be matched using the user-defined rules 107. If a dealer accepts a last-look trade their fill rate increases; if they reject a last-look trade their fill rate decreases and this information is recorded in the Historical datastore. The rule queries the historical datastore 113 as indicated by the stmt.executeQuery( . . . ) line of code. The SQL statement provided as a string in this statement is omitted because the name of the table and other details depend on the schema in that datastore and will vary depending on the particular implementation. As specified by the second rule 107 through encoding in the SQL, dealers are sorted by fill rate on this instrument. The dealer identifiers which are presumed to be the same in the historical datastore 113 as in the participantId field of Object are used to resort the list of maker objects, and this re-sorted list is returned by the rule as prioritizedMakerObjects.

The third rule (107) applies only to the instrument 'usd/try tom'. This rule specifies that on certain instruments, credit lines may be limited, so it may be desirable to ensure that throughout the trading day more rather than fewer dealers remain for a taker to trade with. Consequently, rather than exhausting smaller credit lines earlier in the day and having fewer dealers remaining to trade with, the participant may seek to utilize dealers with the largest remaining credit lines first. The code for this rule is substantially similar in structure to that of the second rule. The key difference is that the credit line datastore 111 is queried instead of the historical datastore 113, and the sorting of maker objects returned is not on the basis of fill rates but instead on the basis of remaining credit between the taker and dealer. Thus, as specified by the third rule 107 through encoding in the SQL, dealers are sorted based on remaining credit between the taker and dealer.

An (implicit) fourth rule (107) is the 'catch-all' for everything that doesn't match an explicit rule and is the last line of code in the method that simply returns the input parameter makerObjects, thus causes the exchange's default matching algorithm to be used. Note that the conditional "if/else if" statements may form a hierarchical ordering in which to apply the first through fourth rules 107.

The credit line datastore 111 may store credit line relationships among participants 101 and it is also connected to the matching algorithm 124 of the matching engine 120. The matching algorithm 124 may determine whether two contra objects are eligible to match with one another (i.e., checks whether bilateral credit exists using information from the credit line datastore 111, as well as ensuring the objects are price-compatible and on contra-sides), and if so causes them to match. When a match occurs between objects from participants 101, the matching algorithm 124 also updates the credit line datastore to 'drawdown' the credit lines between the two participants' lines in the amount of the match.

The historical datastore 113 stores historical data relating to (but not necessarily limited to) best-execution factors the exchange operator is willing to expose to participants. Such historical data may include the fill rates between a dealer and a participant on each instrument under various conditions (e.g., degrees of volatility), and market impact as quantified by price movements at various points in time after a trade (e.g., 1 ms, 5 ms, 10 ms, 100 ms, 1 s, 5 s, 20 s, etc) between the dealer and a participant. Other such historical data may also be relevant; the list is intended to be exemplary and non-limiting.

The rules datastore 115 may store rules specified by market participants 101 that codify their individual notions of best-execution of their taker objects against dealer's maker objects. Participants are able to specify a prioritized list of these rules for storage in the Rules Datastore as computer code in a domain-specific language, or general purpose programming language. The rules may be stored as user-defined rules code 105 in association with a participant identifier that identifies a market participant 101 that provided the user-defined rules code 105 for encoding user-defined rules 107.

The permission manager 130 may determine what historical data from the historical datastore 113 and which rules from the rules datastore 115 respectively, that each participant 101 may access. In some examples, an operator of the electronic exchange 110 may design the permission manager 130 to provide, to a participant 101, the participant's fill rates against a dealer and the aggregate of fill rates across other participants 101 without identification of those other participants 101. Similarly the permission manager 130 may provide access to templates of rules that all participants 101 may access (such as to serve as examples for creation of rules, or to simply use as-is without customization). It should be noted that participants 101 may create and modify rules that are private to that participant. In some examples, the permission manager 130 may permit a participant 101 to only able to view/edit their own specific credit lines and not those of other participants 101 to ensure security and/or confidentiality of the credit line data. It should be noted, however, that the permission manager 130 may permit participants 101 to modify and view the credit lines they extend to other participants.

To facilitate user-defined rules for matching, the matching algorithm 124 may be improved to access user-defined rules code 105, which may be stored in rules datastore 115, provided by market participants 101 and historical data, which may be stored in the historical datastore 113. Upon receiving a taker object the Matching Algorithm component will now determine (e.g., using the SenderCompId in the object messages) the identity of the participant who sent that object and retrieve the rules associated with that participant. If the participant has not created such rules then it may use conventional or default matching algorithm provided by the exchange. If however, such rules do exist, then it will given the current market conditions that the market operator has chosen to expose as parameters to the rules (e.g., realized volatility for some time periods immediately before the trade, the time of day, the instrument, and so on) find the highest priority rule specified by the market participant in the rules datastore 115 to determine which maker object(s) should match. In a non-limiting embodiment the rules may require that among all the contra maker objects that are price-compatible with the taker object each rule returns an objected, priority list of those maker objects. In this way the Matching Algorithm component may sequentially iterate over each object in this (objected) list, creating matches and checking then drawing down credit until either the aggregate quantity of the credit-compatible maker objects is exhausted or the taker object is completely filled.

In some examples, the matching algorithm 124 may, for purposes of auditing and continuous collection of historical data, update the historical datastore 113 with the specific rule invoked by a matched object (also referred to as a trade) and specifics of the market conditions that caused that specific rule to be chosen (an example of such specifics is that volatility exceeded a value of 0.9 and the trade was during London trading hours), details of the resulting individual matches (such as who was it with, its price and quantity, and whether or not it was ultimately accepted or rejected), the state of the content of the limit object book 122 at the tick immediately prior to the taker object being received, and/or other data relating to the trade. The matching algorithm 124 may continue to update the historical datastore 113 at various intervals for a period after the trade with market bids and offers at those intervals to (ultimately) calculate the price impact of the trade (regardless of whether the trade is accepted or rejected by the dealer).

Figure 2:
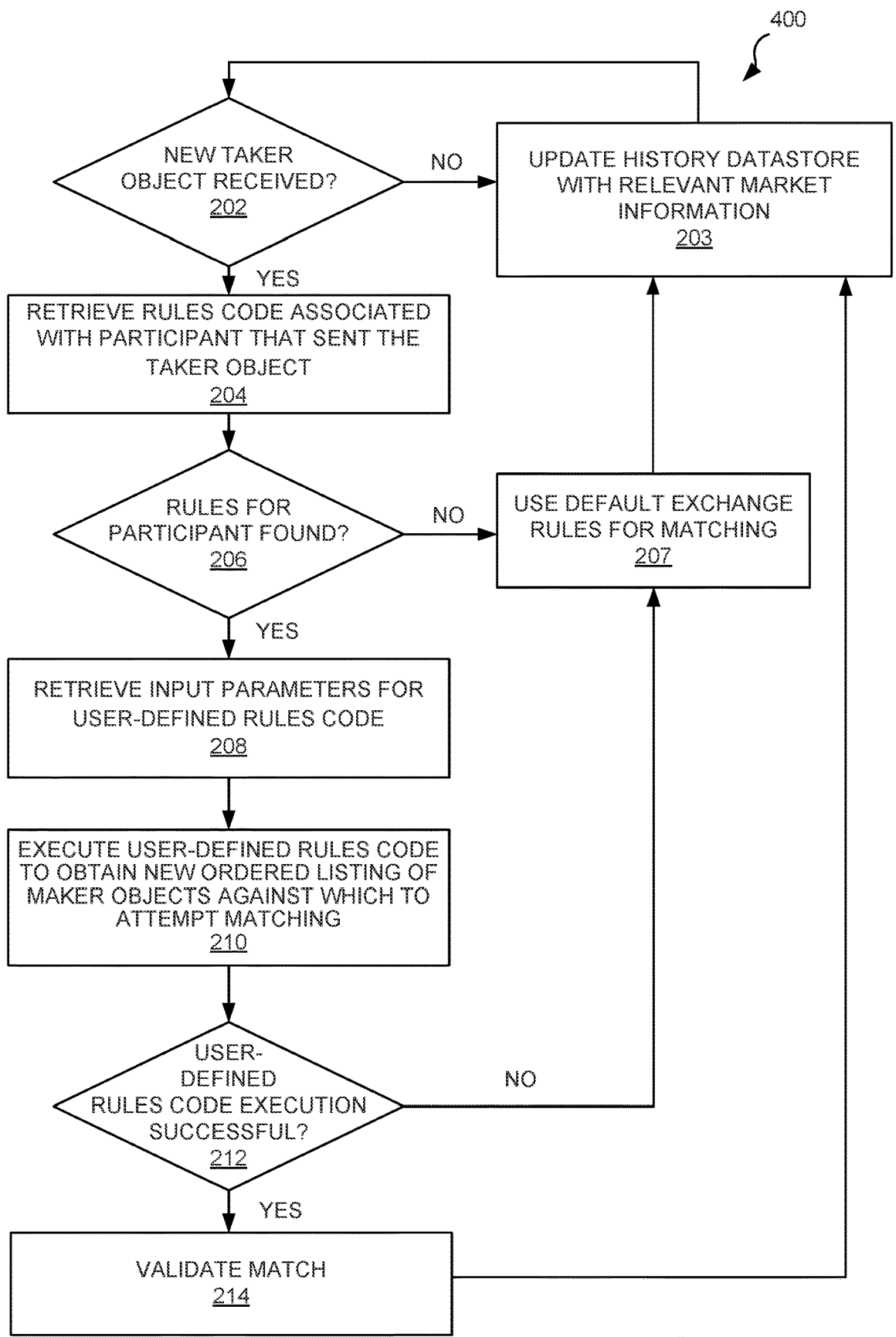
FIG. 2 illustrates an example of a method for user-defined matching of objects at an electronic exchange.

FIG. 2 illustrates an example of a method 200 of user-defined matching of objects 103 at an electronic exchange 110. The method 200 will be described as being executed by the electronic exchange 110 illustrated in FIG. 1 to match taker objects, although other types of objects may be matched.

At 202, the electronic exchange 110 may periodically check for a new taker object to be received. The periodicity may vary depending on particular implementations. If no new taker object is received, at 203, the electronic exchange 110 may update the historical datastore 113 with relevant market information. The relevant market information may include realized volatility on each instrument calculated at varying timescales, the bids/asks for each instrument, and/or other market data relating to an instrument traded on the electronic exchange 110.

At 204, upon receiving a new taker object, the electronic exchange 110 attempts to retrieve user-defined rules code (such as user-defined rules code 105 illustrated in FIG. 1) associated with the participant identifier of the market participant 101 that submitted the taker object (such as an object 103 illustrated in FIG. 1). The user-defined rules code may be stored in the rules datastore 115 in association with the participant identifier that submitted the user-defined rules code to override the default exchange rules. As such, the user-defined rules code may be queried such as using SQL or other data retrieval technique using the participant identifier as a search term.

At 206, if the user-defined rules code is not found for the participant identifier, at 207, the electronic exchange 110 uses its default matching rules codified in default program code and ultimately proceeds to wait for the next new taker object at 202 while continually updating the historical datastore 113 with relevant information at 203.

Returning to 206, if the user-defined rules code does exist for the participant identifier, then it is retrieved and executed by the electronic exchange 110 to determine the priority ordering of maker objects against which the electronic exchange 110 should attempt matching.

At 208, the electronic exchange 110 may retrieve input parameters for the user-defined rules code. The input parameters may include the list of maker objects the given taker object is price-compatible with, making available data in the historical datastore 113 and credit line datastore 111, as well as providing a reference to the taker object.

At 210, the electronic exchange 110 may execute the user-defined rules code to obtain a new ordered listing of maker objects against which to attempt matching.

At 212, if there is an error or exception in executing the code, or the execution is otherwise not considered by the electronic exchange 110 to be successful (for example, the electronic exchange 110 has imposed a per participant criteria to force execution using its default execution algorithm at least 20% of the time) the electronic exchange 110 default algorithm is used for matching at 207. Otherwise, at 214, the ordering produced by the user-defined rules code is used for matching. Matching on this new ordered listing of maker objects may still be subject to further validation, such as consideration of additional factors. These additional validation factors may include a requirement of the existence of credit between the maker and taker, and drawing down that credit in the credit line datastore 111 when a maker and taker object are matched.

FIG. 3 illustrates another example of a method 300 for user-defined matching of objects at an electronic exchange 110.

At 302, the method 300 may include providing access to an Application Programming Interface (API) 140 that exposes one or more fields used to match objects and implements default exchange rules defined by the electronic exchange 110 for matching objects at the electronic exchange 110.

At 304, the method 300 may include receiving, from a participant (such as a market participant 101), user-defined rules code 105 and an object 103 to be matched at the matching engine 120. The object 103 may specify a value for each of the one or more fields. For example, the object 103 may specify a limit price, a quantity, an indication of buy or sell side, a participant identifier, and/or other value for a field used in an object. In some examples, the market participant 101 may have provided the user-defined rules code 105 in advance of providing the object 103. For example, the market participant 101 may have previously provided the user-defined rules code 105 as described in the example of the user-defined rules code 105 discussed above with respect to FIG. 1. In this example, the user-defined rules code 105 may be stored at the rules datastore 115, and the method 300 may include retrieving the user-defined rules code 105.

At 306, the method 300 may include executing the user-defined rules code to override, via class extension or implementation of an interface, the default exchange rules with one or more user-defined rules 107 encoded in the user-defined rules code 105. For example, the user-defined rules code 105 may be implemented as a class extension to override an existing class, which is default program code that encodes the default exchange rules. For example, the example of the user-defined rules code 105 illustrated with respect to FIG. 1 may be implemented as a class extension to override default exchange code. Alternatively, or additionally, the user-defined rules code 105 may be implemented as an interface that provides communicates with the default exchange code to provide different, user-defined, rules for matching.

At 308, the method 300 may include generating an ordered listing of other objects at the electronic exchange against which the object is to be matched based on the user-defined rules and the value for each of the one or more fields.

Figure 4:
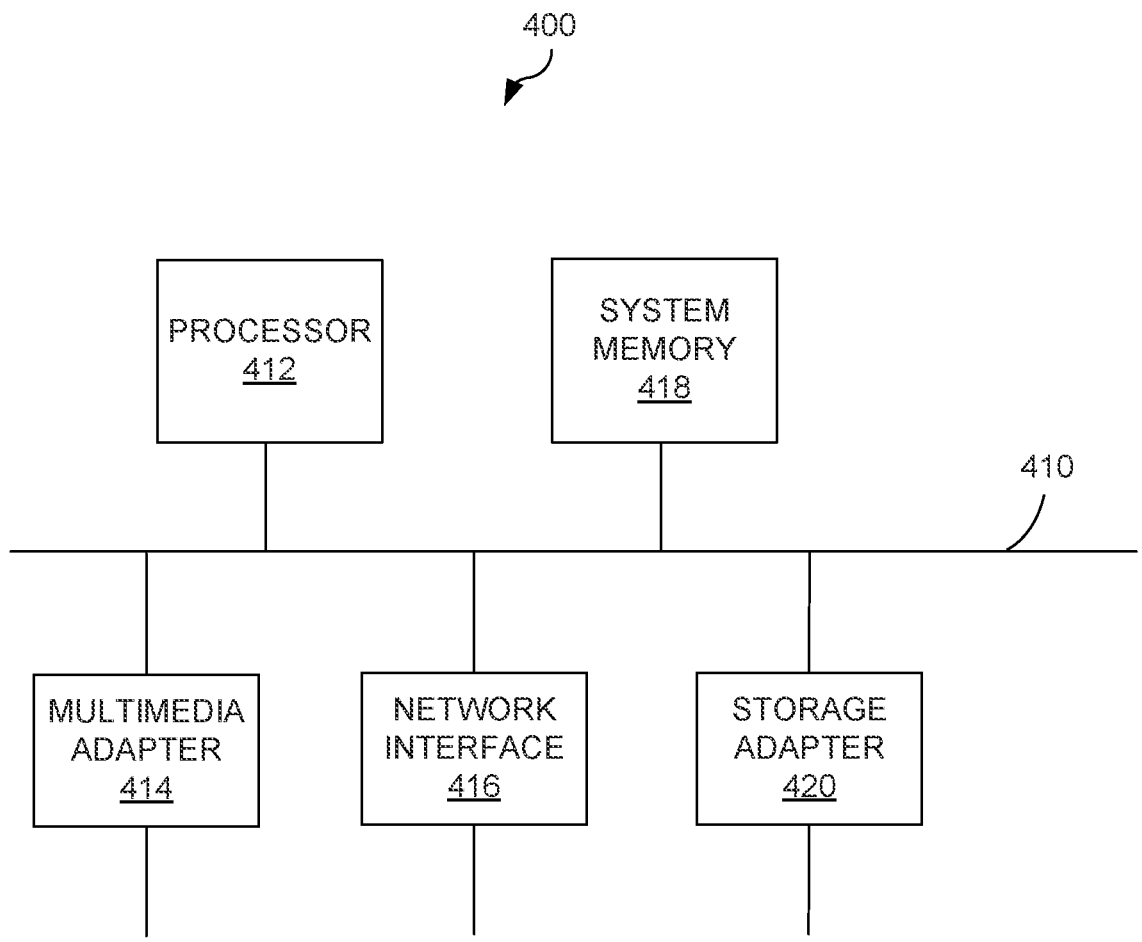
FIG. 4 illustrates an example of a computer system illustrated in FIG. 1.

FIG. 4 illustrates an example of a computer system 400 that may be implemented by the computer system illustrated in FIG. 1. The computer system 400 may include, among other things, an interconnect 410, a processor 412, a multimedia adapter 414, a network interface 416, a system memory 418, and a storage adapter 420.

The interconnect 410 may interconnect various subsystems, elements, and/or components of the computer system 400. As shown, the interconnect 410 may be an abstraction that may represent any one or more separate physical buses, point-to-point connections, or both, connected by appropriate bridges, adapters, or controllers. In some examples, the interconnect 410 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1364 bus, or "firewire," or other similar interconnection element.

In some examples, the interconnect 410 may allow data communication between the processor 412 and system memory 418, which may include read-only memory (ROM) or flash memory (neither shown), random-access memory (RAM), and/or other non-transitory computer readable media (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 412 may control operations of the computer system 400. In some examples, the processor 412 may do so by executing instructions such as software or firmware stored in system memory 418 or other data via the storage adapter 420. In some examples, the processor 412 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 414 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 416 may provide the computer system 400 with an ability to communicate with a variety of remote devices over a network. The network interface 416 may include, for example, an Ethernet adapter, a Fibre Channel adapter, and/or other wired- or wireless-enabled adapter. The network interface 416 may provide a direct or indirect connection from one network element to another, and facilitate communication and between various network elements.

The storage adapter 420 may connect to a standard computer readable medium for storage and/or retrieval of information, such as a fixed disk drive (internal or external).

Other devices, components, elements, or subsystems (not illustrated) may be connected in a similar manner to the interconnect 410 or via a network. The network may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

The devices and subsystems can be interconnected in different ways from that shown in FIG. 4. Instructions to implement various examples and implementations described herein may be stored in computer-readable storage media such as one or more of system memory 418 or other storage. Instructions to implement the present disclosure may also be received via one or more interfaces and stored in memory. The operating system provided on computer system 400 may be MS-DOS®, MS-WINDOWS®, OS/2®, OS X®, IOS®, ANDROID®, UNIX®, Linux®, or another operating system.

In FIG. 1, as well as in other drawing Figures, different numbers of entities than those depicted may be used. Furthermore, according to various implementations, the components described herein may be implemented in hardware and/or software that configure hardware.

For simplicity and illustrative purposes, the disclosure included descriptions that may refer to examples. In the description, numerous specific details have been set forth in object to provide a thorough understanding of the present disclosure. It will be readily apparent however, that the disclosure may be practiced without limitation to these specific details. In other instances, some methods and structures have not been described in detail so as not to unnecessarily obscure the present disclosure. In some instances, various method operations may be omitted and the various method operations are not necessarily performed in the object in which they are presented.

Throughout the disclosure, the term "a" and "an" may be intended to denote at least one of a particular element. As used herein, the term "includes" means includes but not limited to, the term "including" means including but not limited to. The term "based on" means based at least in part on.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. As such, the disclosure is intended to be defined by the following claims—and their equivalents—in which all terms are meant in their broadest reasonable sense unless otherwise indicated.

What is claimed is:

1. A system of user-defined matching of objects at an electronic exchange, the system comprising a processor to:
provide access to an Application Programming Interface (API) that exposes one or more fields used to match objects and implements default exchange rules defined by the electronic exchange for matching objects at the electronic exchange;
receive, from a user, a taker order comprising an object to be matched with other objects at the electronic exchange, the object specifying a value for each of the one or more fields;
determine that the user that submitted the taker order has previously provided user-defined rules code for matching taker orders from the user to be used instead of the default exchange rules,
wherein the user-defined rules code defines computer-executable code that specifies how to prioritize the other objects that match with the taker order based at least on price and replaces default exchange code that specifies how to do this prioritization;
execute the user-defined rules code to override, via class extension or implementation of an interface, the default exchange rules with one or more user-defined rules encoded in the user-defined rules code; and
generate, according to the prioritization specified by the user-defined rules code, an ordered listing of the other objects at the electronic exchange against which the taker order comprising the object is to be matched based on the user-defined rules instead of the default exchange rules and the value for each of the one or more fields.

2. The system of claim 1, wherein to generate the ordered listing, the processor is to:
determine a hierarchical ordering of the one or more user-defined rules from the executed user-defined rules code, the hierarchical ordering being encoded in the user-defined rules code; and
apply the hierarchical ordering to generate the ordered listing.

3. The system of claim 2, wherein to apply the hierarchical ordering, the processor is to generate a user-defined ordered listing of objects against which the object is matched by the electronic exchange instead of a default ordered listing that is generated based on the default exchange rules.

4. The system of claim 2, wherein to determine the hierarchical ordering, the processor is to:
step through execution of conditional clauses of the user-defined rules code, each conditional clause encoding a corresponding user-defined rule.

5. The system of claim 1, wherein the processor is to:
randomly determine whether to apply the user-defined rules or the default exchange rules to prevent starvation of objects, which would otherwise not be matched if the user-defined rules are used, so that continued collection of fill rate data from other users occur for observation by the electronic exchange.

6. The system of claim 5, wherein to randomly select whether to apply the user-defined rules, the processor is to:
set a randomization condition that ensures that the default exchange rules are used instead of the user-defined rule or other user-defined rules for a minimum percentage of time.

7. The system of claim 1, wherein the processor is further to:
    generate a match based on the user-defined rules; and
    evaluate the match based on the default exchange rules to confirm that the match also satisfies the default exchange rules.

8. The system of claim 1, wherein the processor is further to:
    retrieve, from a historical parameters database, historical parameters on market conditions and trades to match the object with the one or more other objects; and
    wherein the processor is further to determine that a market condition of a second object from among the one or more other objects will satisfy the one or more matching rules based on historical parameters on market conditions and trades.

9. The system of claim 8, wherein the processor is further to:
    record the market condition of the object before the match;
    record the market condition of the object after the match; and
    store the market condition in the historical parameters database.

10. The system of claim 1, wherein the processor is further to:
    determine whether or not to provide the user with access to historical data of the user and/or historical data of other users.

11. The system of claim 1, wherein the processor is further to:
    determine whether or not to provide the user with access to edit and/or view the user-defined rules.

12. A method of user-defined matching of objects at an electronic exchange, the method comprising:
    providing, by a processor, access to an Application Programming Interface (API) that exposes one or more fields used to match objects and implements default exchange rules defined by the electronic exchange for matching objects at the electronic exchange;
    receiving, by the processor, from a user, a taker order comprising an object to be matched with other objects at the electronic exchange, the object specifying a value for each of the one or more fields;
    determining, by the processor, that the user that submitted the taker order has previously provided user-defined rules code for matching taker orders from the user to be used instead of the default exchange rules,
    wherein the user-defined rules code defines computer-executable code that specifies how to prioritize the other objects that match with the taker order based at least on price and replaces default exchange code that specifies how to do this prioritization;
    executing, by the processor, the user-defined rules code to override, via class extension or implementation of an interface, the default exchange rules with one or more user-defined rules encoded in the user-defined rules code; and
    generating, by the processor, according to the prioritization specified by the user-defined rules code, an ordered listing of the other objects at the electronic exchange against which the object is to be matched based on the user-defined rules instead of the default exchange rules and the value for each of the one or more fields.

13. The method of claim 12, wherein generating the ordered listing comprises:
    determining a hierarchical ordering of the one or more user-defined rules from the executed user-defined rules code, the hierarchical ordering being encoded in the user-defined rules code; and
    applying the hierarchical ordering to generate the ordered listing.

14. The method of claim 12, wherein applying the hierarchical ordering comprises:
    generating a user-defined ordered listing of objects against which the object is matched by the electronic exchange instead of a default ordered listing that is generated based on the default exchange rules.

15. The method of claim 13, wherein determining the hierarchical ordering comprises:
    stepping through execution of conditional clauses of the user-defined rules code, each conditional clause encoding a corresponding user-defined rule.

16. The method of claim 12, further comprising:
    randomly determining whether to apply the user-defined rules or the default exchange rules to prevent starvation of objects, which would otherwise not be matched if the user-defined rules are used, so that continued collection of fill rate data from other users occur for observation by the electronic exchange.

17. The method of claim 16, wherein randomly determining whether to apply the user-defined rules comprises:
    setting a randomization condition that ensures that the default exchange rules are used instead of the user-defined rule or other user-defined rules for a minimum percentage of time.

18. The method of claim 12, further comprising:
    generating a match based on the user-defined rules; and
    evaluating the match based on the default exchange rules to confirm that the match also satisfies the default exchange rules.

19. A computer-readable medium that stores instructions that when executed by a processor, causes the processor to:
    provide access to an Application Programming Interface (API) that exposes one or more fields used to match objects and implements default exchange rules defined by an electronic exchange for matching objects at the electronic exchange;
    receive, from a user, a taker order comprising an object to be matched with other objects at the electronic exchange, the object specifying a value for each of the one or more fields;
    determine that the user that submitted the taker order has previously provided user-defined rules code for matching taker orders from the user to be used instead of the default exchange rules,
    wherein the user-defined rules code defines computer-executable code that specifies how to prioritize the other objects that match with the taker order based at least on price and replaces default exchange code that specifies how to do this prioritization;
    execute the user-defined rules code to override, via class extension or implementation of an interface, the default exchange rules with one or more user-defined rules encoded in the user-defined rules code; and
    generate, according to the prioritization specified by the user-defined rules code, an ordered listing of the other objects at the electronic exchange against which the object is to be matched based on the user-defined rules instead of the default exchange rules and the value for each of the one or more fields.

20. The computer-readable medium of claim 19, wherein the instructions when executed further cause the processor to:
  determine a hierarchical ordering of the one or more user-defined rules from the executed user-defined rules code, the hierarchical ordering being encoded in the user-defined rules code; and
  apply the hierarchical ordering to generate the ordered listing.

* * * * *